(12) United States Patent
Wright

(10) Patent No.: US 9,892,392 B2
(45) Date of Patent: Feb. 13, 2018

(54) SYSTEM AND METHOD FOR THE DISTRIBUTION OF SOFTWARE PRODUCTS

(71) Applicant: Intel Corporation, Santa Clara, CA (US)

(72) Inventor: Andrew C. Wright, Sammamish, CA (US)

(73) Assignee: Intel Corporation, Santa Clara, CA (US)

( * ) Notice: Subject to any disclaimer, the term of this patent is extended or adjusted under 35 U.S.C. 154(b) by 5 days.

(21) Appl. No.: 14/808,638

(22) Filed: Jul. 24, 2015

(65) Prior Publication Data

US 2015/0332231 A1  Nov. 19, 2015

Related U.S. Application Data

(60) Continuation of application No. 14/163,758, filed on Jan. 24, 2014, now abandoned, which is a
(Continued)

(51) Int. Cl.
*G06Q 30/00* (2012.01)
*G06Q 20/14* (2012.01)
*G10L 15/00* (2013.01)
*G06Q 30/02* (2012.01)
*G06Q 30/06* (2012.01)
(Continued)

(52) U.S. Cl.
CPC ............. *G06Q 20/14* (2013.01); *G06Q 10/08* (2013.01); *G06Q 20/102* (2013.01); *G06Q 20/123* (2013.01); *G06Q 20/127* (2013.01); *G06Q 20/204* (2013.01); *G06Q 30/02* (2013.01); *G06Q 30/0209* (2013.01); *G06Q 30/0226* (2013.01); *G06Q 30/0235* (2013.01); *G06Q 30/0239* (2013.01); *G06Q 30/04* (2013.01);
(Continued)

(58) Field of Classification Search
CPC ..................................................... G06Q 30/00
See application file for complete search history.

(56) References Cited

U.S. PATENT DOCUMENTS

| | | |
|---|---|---|
| 5,970,470 A | 10/1999 | Walker |
| 6,415,262 B1 | 7/2002 | Walker |

(Continued)

OTHER PUBLICATIONS

Vogel, Christine, "It all began when I received a computer generated . . . ", Sun Sentinel, dated Jan. 25, 1987.*
(Continued)

*Primary Examiner* — Mark A Fadok
(74) *Attorney, Agent, or Firm* — Christopher K. Gagne

(57) ABSTRACT

A system and method for selling software products over a network. The system includes a server computer with access to software products. The system is configured to allow a user to purchase a subscription for the periodic acquisition of selected software products. In one embodiment, as part of the subscription, the user pays an amount during selected billing intervals. In return, the system issues to the user a number of credits for downloading at no additional charge at least one of the software products during a credit interval, which may be equal in length to the billing interval. In one embodiment, the system debits a number of credits in response to fulfilling a user's purchase request. The system may be also configured to deduct credits that are not used within selected credit intervals.

16 Claims, 7 Drawing Sheets

Related U.S. Application Data continuation of application No. 13/919,822, filed on Jun. 17, 2013, now Pat. No. 8,639,583, which is a division of application No. 12/710,269, filed on Feb. 22, 2010, now Pat. No. 8,484,091, which is a division of application No. 10/390,503, filed on Mar. 13, 2003, now Pat. No. 7,668,752.

(51) Int. Cl.
*G06Q 10/08* (2012.01)
*G06Q 20/20* (2012.01)
*G06Q 30/04* (2012.01)
*G06Q 20/10* (2012.01)
*G06Q 20/12* (2012.01)

(52) U.S. Cl.
CPC ......... *G06Q 30/06* (2013.01); *G06Q 30/0601* (2013.01); *G06Q 30/0633* (2013.01); *G10L 15/00* (2013.01)

(56) References Cited

U.S. PATENT DOCUMENTS

| | | | |
|---|---|---|---|
| 6,473,858 B1 | 10/2002 | Shimomura | |
| 6,633,903 B1* | 10/2003 | Gould | G06Q 30/06 707/E17.108 |
| 6,915,107 B1 | 7/2005 | Lusk | |
| 7,010,500 B2* | 3/2006 | Aarnio | G06Q 30/0239 380/247 |
| 7,089,335 B2* | 8/2006 | Aiken | H04L 29/06 707/999.1 |
| 7,130,814 B1* | 10/2006 | Szabo | G06Q 30/0201 186/26 |
| 7,251,617 B1 | 7/2007 | Walker | |
| 7,263,710 B1* | 8/2007 | Hummel, Jr. | G06F 19/324 434/262 |
| 7,647,409 B2 | 1/2010 | Banerjee | |
| 7,668,752 B2 | 2/2010 | Wright | |
| 7,668,782 B1 | 2/2010 | Reistad | |
| 7,835,989 B1* | 11/2010 | Hendricks | G06F 17/3089 705/50 |
| 7,849,393 B1* | 12/2010 | Hendricks | H04N 5/4401 715/203 |
| 7,853,495 B2 | 12/2010 | Kamada | |
| 8,484,091 B2 | 7/2013 | Wright | |
| 8,606,684 B2* | 12/2013 | Bi | G06F 21/10 705/30 |
| 8,639,583 B2 | 1/2014 | Wright | |
| 9,053,640 B1* | 6/2015 | Hendricks | G06F 17/21 |
| 2001/0000045 A1 | 3/2001 | Yu | |
| 2001/0000505 A1 | 4/2001 | Segal | |
| 2001/0000663 A1 | 5/2001 | Shahoian | |
| 2001/0000709 A1 | 5/2001 | Takahashi | |
| 2001/0016836 A1 | 8/2001 | Boccon-Gibod | |
| 2001/0025260 A1 | 9/2001 | Blumofe | |
| 2001/0027558 A1 | 10/2001 | Sasselli | |
| 2001/0034717 A1 | 10/2001 | Whitworth | |
| 2001/0049620 A1 | 12/2001 | Blasko | |
| 2002/0029173 A1 | 3/2002 | Goldstein | |
| 2002/0072969 A1 | 6/2002 | Fisher | |
| 2002/0095651 A1* | 7/2002 | Kumar | G06F 9/547 717/104 |
| 2002/0104019 A1 | 8/2002 | Chatani | |
| 2002/0107809 A1 | 8/2002 | Biddle | |
| 2002/0109736 A1 | 8/2002 | Chailleux | |
| 2002/0111907 A1 | 8/2002 | Ling | |
| 2002/0123956 A1 | 9/2002 | Galuten | |
| 2002/0131404 A1 | 9/2002 | Mehta | |
| 2002/0147689 A1 | 10/2002 | Falkner | |
| 2002/0154157 A1* | 10/2002 | Sherr | G06F 21/10 715/716 |
| 2002/0165026 A1 | 11/2002 | Perkins | |
| 2002/0174010 A1 | 11/2002 | Rice | |
| 2002/0174356 A1 | 11/2002 | Padole | |
| 2003/0005133 A1 | 1/2003 | Banerjee | |
| 2003/0032476 A1* | 2/2003 | Walker | G06Q 20/00 463/25 |
| 2003/0093336 A1* | 5/2003 | Ukita | G06Q 10/087 705/28 |
| 2003/0101092 A1 | 5/2003 | Fuller | |
| 2003/0115069 A1 | 6/2003 | Pence | |
| 2003/0160823 A1 | 8/2003 | Stannard | |
| 2003/0182139 A1* | 9/2003 | Harris | G06F 17/30017 705/1.1 |
| 2004/0015993 A1* | 1/2004 | Yacenda | H04N 7/17336 725/87 |
| 2004/0039648 A1 | 2/2004 | Candelore | |
| 2004/0063497 A1 | 4/2004 | Gould | |
| 2004/0078274 A1 | 4/2004 | Aarnio | |
| 2004/0163135 A1 | 8/2004 | Giaccherini | |
| 2004/0181591 A1 | 9/2004 | Yu | |
| 2005/0144074 A1 | 6/2005 | Fredregill | |
| 2013/0282572 A1 | 10/2013 | Wright | |

OTHER PUBLICATIONS

Menta, Richard, "Musicnet and Duet: downloads expire after 30 days", MP3newswire.net, dated May 17, 2001.*
Gold, Gerald, "Record notes; Book-Of-The-Month expands", The New York Times, dated Sep. 23, 1984.*
Realnetworks1, "http://webarchive.org/web/200111264823", dated Nov. 26, 2001.*
Gussow, Dave, "Net music takes a big step forwward", Tampabay.com, Dated Jan. 28, 2002.*
real.com1, https://web.archive.org/web/20011111013144/http://www.real.com, dated Nov. 11, 2001.*
real.com2, https://web.archive.org/web/200111113220011/http://www.realarchade.com:80/index.html?lang=&loc=&src=011011realhome_2, dated Nov. 11, 2001.*
real.com3, https://web.archive.org/web/200111113220011/http://www.realarcade.com:80/index.html?la . . . , dated Nov. 11, 2001.*
real.com4, https://web.archive.org/web/20011113002325/http://realguide.real.com:80/games/, dated Nov. 11, 2001.*
real.com5, https://web.archive.org/web/20011221083014/http://gamesforum.real.com:80/games/, dated Nov. 22, 2001.*
Vogel, "It all began when I received a computer generated . . . ", Sun Sentinel, Jan. 25, 1987.
Menta, "Musicnet and Duet: downloads expire after 30 days", MP3newswire.net, May 17, 2001.
Gold, "Record notes: Book-Of-The-Month expands", The New York Times, Sep. 23, 1984.
Office Action (and related attachments) dated Sep. 9, 2016 in U.S. Appl. No. 14/808,660, filed Jul. 24, 2015.
Office Action (and related attachments) dated Oct. 4, 2016 in U.S. Appl. No. 14/808,647, filed Jul. 24, 2015.
Office Action (and related attachments) dated Sep. 29, 2016 in U.S. Appl. No. 14/808,638, filed Jul. 24, 2015.
Office Action (and related attachments) dated Sep. 29, 2016 in U.S. Appl. No. 14/808,614, filed Jul. 24, 2015.
Office Action (and related attachments) dated Sep. 9, 2016 in U.S. Appl. No. 14/808,697, filed Jul. 24, 2015.
Notice of Allowance (and related attachments) dated Oct. 5, 2009 in U.S. Appl. No. 10/390,503, filed Mar. 13, 2003.
Office Action (and related attachments) dated Jan. 13, 2009 in U.S. Appl. No. 10/390,503, filed Mar. 13, 2003.
Office Action (and related attachments) dated Nov. 17, 2008 in U.S. Appl. No. 10/390,503, filed Mar. 13, 2003.
Office Action (and related attachments) dated Sep. 4, 2008 in U.S. Appl. No. 10/390,503, filed Mar. 13, 2003.
Office Action (and related attachments) dated May 19, 2008 in U.S. Appl. No. 10/390,503, filed Mar. 13, 2003.
Office Action (and related attachments) dated Aug. 14, 2007 in U.S. Appl. No. 10/390,503, filed Mar. 13, 2003.
Office Action (and related attachments) dated Feb. 23, 2007 in U.S. Appl. No. 10/390,503, filed Mar. 13, 2003.

(56) References Cited

OTHER PUBLICATIONS

Office Action (and related attachments) dated Oct. 5, 2006 in U.S. Appl. No. 10/390,503, filed Mar. 13, 2003.
Office Action (and related attachments) dated Mar. 21, 2006 in U.S. Appl. No. 10/390,503, filed Mar. 13, 2003.
Office Action (and related attachments) dated Dec. 7, 2005 in U.S. Appl. No. 10/390,503, filed Mar. 13, 2003.
Office Action (and related attachments) dated Feb. 28, 2013 in U.S. Appl. No. 12/710,269, filed Feb. 22, 2010.
Office Action (and related attachments) dated Nov. 14, 2012 in U.S. Appl. No. 12/710,269, filed Feb. 22, 2010.
Office Action (and related attachments) dated Oct. 19, 2012 in U.S. Appl. No. 12/710,269, filed Feb. 22, 2010.
Office Action (and related attachments) dated Jul. 10, 2012 in U.S. Appl. No. 12/710,269, filed Feb. 22, 2010.
Office Action (and related attachments) dated Aug. 23, 2016 in U.S. Appl. No. 14/163,758, filed Jan. 24, 2014.
Office Action (and related attachments) dated Feb. 19, 2016 in U.S. Appl. No. 14/163,758, filed Jan. 24, 2014.
Office Action (and related attachments) dated Oct. 1, 2015 in U.S. Appl. No. 14/163,758, filed Jan. 24, 2014.
Office Action (and related attachments) dated Jul. 24, 2015 in U.S. Appl. No. 14/163,758, filed Jan. 24, 2014.
Office Action (and related attachments) dated Jul. 10, 2015 in U.S. Appl. No. 14/163,758, filed Jan. 24, 2014.
Office Action (and related attachments) dated Apr. 6, 2015 in U.S. Appl. No. 14/163,758, filed Jan. 24, 2014.
Office Action (and related attachments) dated Sep. 30, 2013 in U.S. Appl. No. 13/919,822, filed Jun. 17, 2013.
Notice of Allowance (and related attachments) dated Mar. 15, 2013 in U.S. Appl. No. 12/710,269, filed Feb. 22, 2010.
Office Action dated Jan. 13, 2017 in U.S. Appl. No. 14/808,660 (and related attachments).
Office Action dated Jan. 13, 2017 in U.S. Appl. No. 14/808,647 (and related attachments).
Office Action dated Jan. 12, 2017 in U.S. Appl. No. 14/808,638 (and related attachments).
Office Action dated Jan. 18, 2017 in U.S. Appl. No. 14/808,614 (and related attachments).
Office Action dated Jan. 13, 2017 in U.S. Appl. No. 14/808,697 (and related attachments).
"Microsoft, Sony to take console gaming online," Chmielewski, Knight Ridder Tribune Business News, May 16, 2002.
Gamesmania.com1, http://www.gamesmania.com/servlet/GCServlet?tf=GamesConnect/about/PurchaseOptions.html&cf=GamesConnect/main.cfg, dated Jan. 8, 2002.
Gamesmania.com2, http://web.archive.org/web/20011221194756/http://www.gamesmania.com/servlet/GCServlet?tf=GamesConnect/index.html&cf=GamesConnect/main.cfg, dated Dec. 21, 2001.
"Here's the dope on online music sites—at a price", Ahrens, The Ottawa Citizen, Jan. 17, 2002.
Realarcade1, http://webarchive.org/web/20011115223336/www.real.com/games/evernight/ind-ex.html?src=webgames, Nov. 11, 2001.
"Price to pay for 'Helbreath' multi-player online game," Muhtar, New Straits Times, Feb. 3, 2003.
"RealNetworks announces worldwide launch of GamePass for RealOne Arcade," PR Newswire, Jul. 1, 2002.
"Net music takes a big step forward," Gussow, St. Petersburg Times, Jan. 28, 2002.
"Free will music: will online music fans pay or just play?", Wright, Gannett News Service, Mar. 4, 2002.
"Firms that charge money for online music swapping sights face a tough sell," Swett, Knight Ridder Tribune Business News, Jan. 17, 2002.
"Online services play the music," Pittsburgh Post—Gazette, Feb. 21, 2002.
"You listen, you pay: post-Napster music services," di Nome, New York Times, Mar. 7, 2002.
"E-world—music buffs beware: record industry wants to control collections," Weber, Asian Wall Street Journal, Dec. 18, 2001.
Screen captures of Real Networks website.
"RealNetworks tries a new tune on the net; music-rental plan puts firm at crossroads", Soto, Seattle Times, Dec. 9, 2001.
"Stocking stuffers for culture lovers," Turegano, The San Diego Union—Tribune, Nov. 22, 1994.
"Cityscape: around intown," Raines, The Atlanta Journal, The Atlanta Constitution, Dec. 20, 2001.
"Early music group from N.O. will play at LSU Feb. 1," Price, Advocate, Jan. 27, 2002.
"Playhouse to come on strong: 2002-3 season lineups given," Martin, San Antonio Express-News, May 12, 2002.
Office Action dated Jun. 12, 2017 in U.S. Appl. No. 14/808,660 (and related attachments).
Office Action dated Jun. 13, 2017 in U.S. Appl. No. 14/808,647 (and related attachments).
Office Action dated Jun. 12, 2017 in U.S. Appl. No. 14/808,638 (and related attachments).
Office Action dated Jun. 13, 2017 in U.S. Appl. No. 14/808,614 (and related attachments).
Office Action dated Jun. 13, 2017 in U.S. Appl. No. 14/808,697 (and related attachments).
Real.com6, https://web.archive.org/web/2002012509248/http://www.real.com:80/, dated Jan. 25, 2002.

\* cited by examiner

SYSTEM AND METHOD FOR THE DISTRIBUTION OF SOFTWARE PRODUCTS

BACKGROUND OF THE INVENTION

Field of the Invention

The field of the invention relates to the sale and distribution of software products. More particularly, the field of the invention relates to a system and method for selling software products via a network.

Description of the Related Technology

The process of manufacturing and distributing software products can be expensive. Manufacturing costs include the cost of purchasing media such as the floppy disks or CD-ROMs, equipment to write the software onto the media, labels to mark the media, and the packaging and shipping costs associated with sending the media to users and purchasers of the product. The manufacturing process includes the preparation of physical media for distribution, and may be very time-consuming depending on the availability of manufacturing resources. Furthermore, labor costs include the cost of coordinating the manufacturing process, the testing process, and the physical distribution process.

In view of these problems, certain distributors have recently turned to selling and transmitting the software products to users via the Internet. As non-limiting examples, software products include: games, business software, databases, audio files, music, audio books, and video files. When selling software products, it is possible to complete the entire transaction, i.e., accept payment from a customer, and deliver the digital content to the customer, within the confines of the Internet. Electronic distribution carries fewer of the costs associated with manufacturing and distributing tangible products.

When selling software products over the Internet, the user typically provides billing information and in return, is then granted access to download the purchased software product. This can be viewed as a one time transaction. The user may or may not at later point in time purchase other software products from the vendor. Disadvantageously, known software distribution systems do not provide vendors with a consistent recurring revenue stream for the sale of multiple different products.

Other distributors have turned to selling subscriptions ("leases") that allow the user to download selected software products and use the products for the term of the subscription. Disadvantageously for the users, at the end of the subscription, the user does not have the right to retain the software. At the end of the subscription, the downloaded software product is typically inoperative. This is less satisfactory to many users than being able to retain ownership of purchased products.

Consequently, vendors have a need for an improved system and method that increases recurring revenue for the sale of software products. Furthermore, the system and method should allow a user to have unrestricted access to the software products that are acquired, and the system and method should provide economic, or otherwise valuable, incentives to the user to place recurrent purchases with a vendor.

DETAILED DESCRIPTION OF CERTAIN EMBODIMENTS OF THE INVENTION

The following detailed description is directed to certain specific embodiments of the invention. However, the invention can be embodied in a multitude of different ways as defined and covered by the claims. In this description, reference is made to the drawings wherein like parts are designated with like numerals throughout.

In some embodiments, the invention concerns systems and methods for evaluating, selling, purchasing, and/or distributing software products over a computer network. In one embodiment, the invention provides a method whereby a consumer benefits by purchasing multiple software products at discounted prices. In another embodiment, the invention provides a subscription plan whereby a consumer conveniently and periodically may purchase software products at prices that are reduced compared to individual, one-time or serial purchases of software products. Moreover, these and other embodiments of the invention benefit the software product manufacturer, marketer, or distributor by, for example, creating a customer subscription base that encourages repeat sells and customer loyalty. These and other advantages of the inventive systems and methods are evident from the detailed description of the invention that follows.

Figure 1:
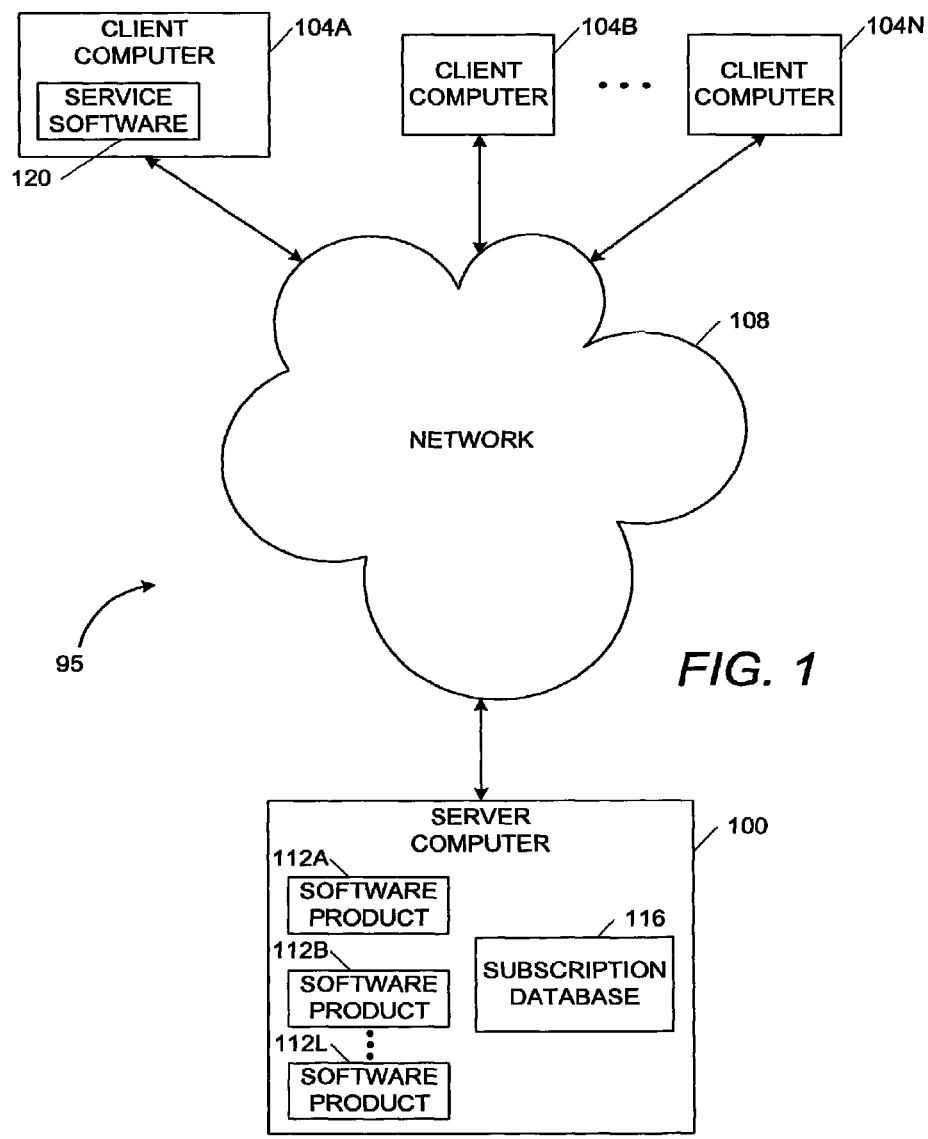
FIG. 1 is a block diagram illustrating an exemplary system for selling and purchasing software products over a network.

FIG. 1 is a block diagram illustrating an exemplary system for selling and purchasing software products. FIG. 1 shows a server computer 100 that is connected to a plurality of client computers 104A-104N via a network 108. The server 100 maintains a plurality of software products 112A-112L that are purchasable by users of the client computers 104A-104N. As non-limiting examples, the software products 112A-112L can include executable code, games, business software, medical software, video files, music, audio files, music programs, movies, and audio books. Software products can also include any digital content that can be transmitted over a communications network, e.g., the Internet. The digital content can be downloaded from the server computer 100 to a client computer 104A.

The server computer 100 provides an interface (see FIGS. 4-5) to allow a user of the client computers 104A-104N to purchase a software subscription. As part of the subscription, the user is required to pay a selected amount during selected intervals, i.e., credit periods, in the subscription period. For example, in one embodiment the user pays $6.95 for a monthly subscription to a computer games distribution program. Of course, the actual amount and length of the credit period may vary widely. That is, the charged amounts may be from nominal ($0.50, for example) to as much as $1,000 or more depending on the software products involved. In return, the user is authorized to download for no additional charge one of the software products 112A-112L during each of the credit periods. The subscription period may be for a predetermined duration, e.g., 3 years, or alternatively, of indefinite duration until cancelled by the provider of the server 100 or one of the users of the client computers 104A-104N. It should be noted that the credit periods may be hours, days, weeks, months, or years, for example.

In one embodiment of the invention, duration of the credit period is the same as each of the billing periods in the subscription. In another embodiment of the invention, there is no relation between the credit period and the billing period. In some embodiments, the methods may include a requirement that the user commit to a predetermined number of multiple subscription periods. For example, the user may be required to pay an up-front amount equal to the periodic payments for the specified number subscription periods. By way of example, the user may be asked to make a one time payment of $20.85 for three subscription periods (3×$6.95) as a condition of gaining membership into the subscription plan. In other embodiments, the user may have the option to buy a lifetime subscription with an up-front payment, or make an up-front payment for a predetermined number of subscription periods.

The server computer 100 maintains a subscription database 116 that stores all subscription information, such as which users have a subscription, payment and billing information, the billing period, the credit period, the subscription period, and which software products 112A-112L have been transmitted to the respective users. It is to be appreciated that the subscription database 116 need not be stored on the server computer 100 as long it is accessible by the server computer via the network 100.

The server computer 100 and the client computers 104A-104N may include any conventional general purpose single- or multi-chip microprocessor such as a Pentium® processor, Pentium II® processor, Pentium III® processor, Pentium IV® processor, a Pentium® Pro processor, a 8051 processor, a MPS® processor, a Power PC® processor, or an ALPHA® processor. In addition, the microprocessor may be any conventional special purpose microprocessor such as a digital signal processor.

The network 108 may include any type of electronically connected group of computers including, for instance, the following networks: Internet, Intranet, Local Area Networks (LAN) or Wide Area Networks (WAN). In addition, the connectivity to the network may be, for example, modem, Ethernet (IEEE 802.3), Token Ring (IEEE 802.5), Fiber Distributed Datalink Interface (FDDI) or Asynchronous Transfer Mode (ATM). Note that computing devices in the network 108, the server computer 100, and the client computers 108A-108N may be desktop, server, portable, handheld, set-top, or any other desired type of configuration. As used herein, the network includes network variations such as the public Internet, a private network within the Internet, a secure network within the Internet, a private network, a public network, a value-added network, an intranet, and the like.

The server computer 100 and the client computers 104A-104N may have one or more input devices. For example, the input device may be a keyboard, rollerball, pen and stylus, mouse, or voice recognition system. The input device may also be a touch screen associated with an output device. The user may respond to prompts on the display by touching the screen. The user may enter textual or graphic information through the input device.

The server computer 100 and the client computers 104A-104N may be used in connection with various operating systems such as: UNIX, LINUX, Disk Operating System (DOS), OS/2, PalmOS, VxWorks, Windows 3.X, Windows 95, Windows 98, Windows NT, Windows CE, and Windows XP.

Figure 4:
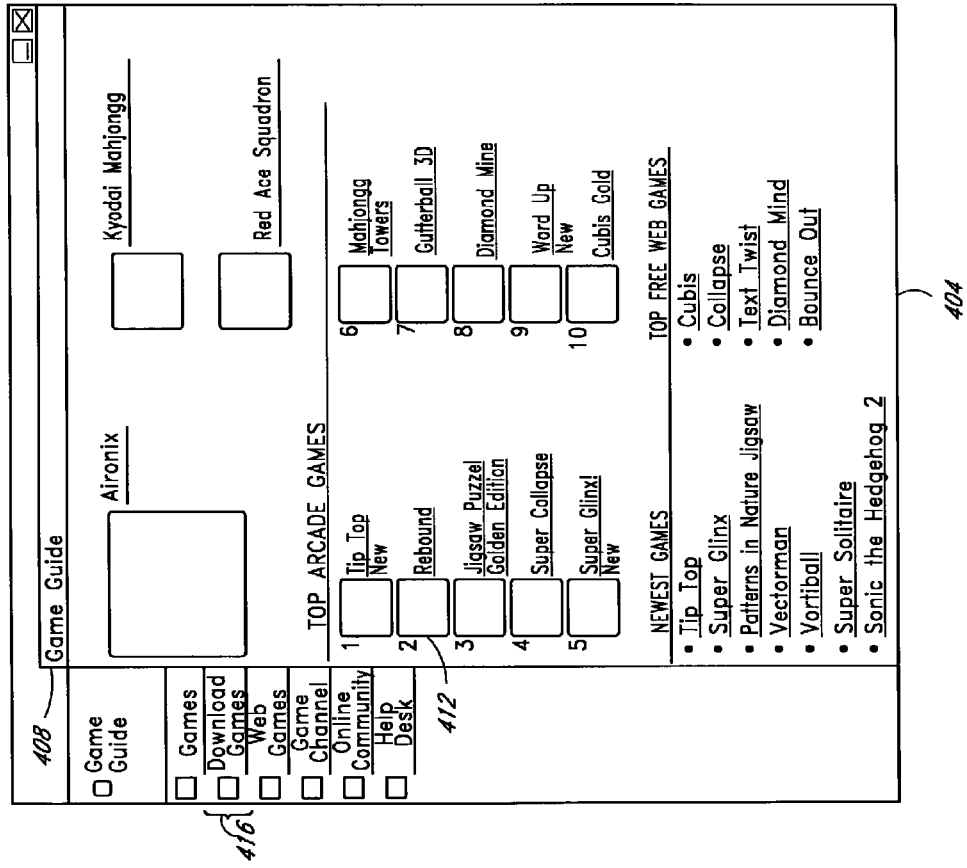
FIG. 4 is an exemplary user interface that may be used in conjunction with the systems and methods for selling and purchasing software products over a network.

In one embodiment of the invention, the client computers 104A-104N each includes service software 120. The service software 120 downloads software products 112A-112L from the server computer 100. In one embodiment of the invention, the service software 120 is an Internet browser such as Internet Explorer published by Microsoft, Inc. of Redmond, Wash., or alternatively, Netscape® by Netscape Communications Corp. of Mountain View, Calif. In another embodiment of the invention, the service software 120 is a digital rights management application program for testing, evaluating, using, and purchasing software products 112A-112L. FIG. 4 depicts an exemplary user interface 404 that may be used in conjunction with the service software 120. The software products 112A-112L need not be manufactured or produced by the administrator of the server 100, but instead, may be resale products.

Figure 2:
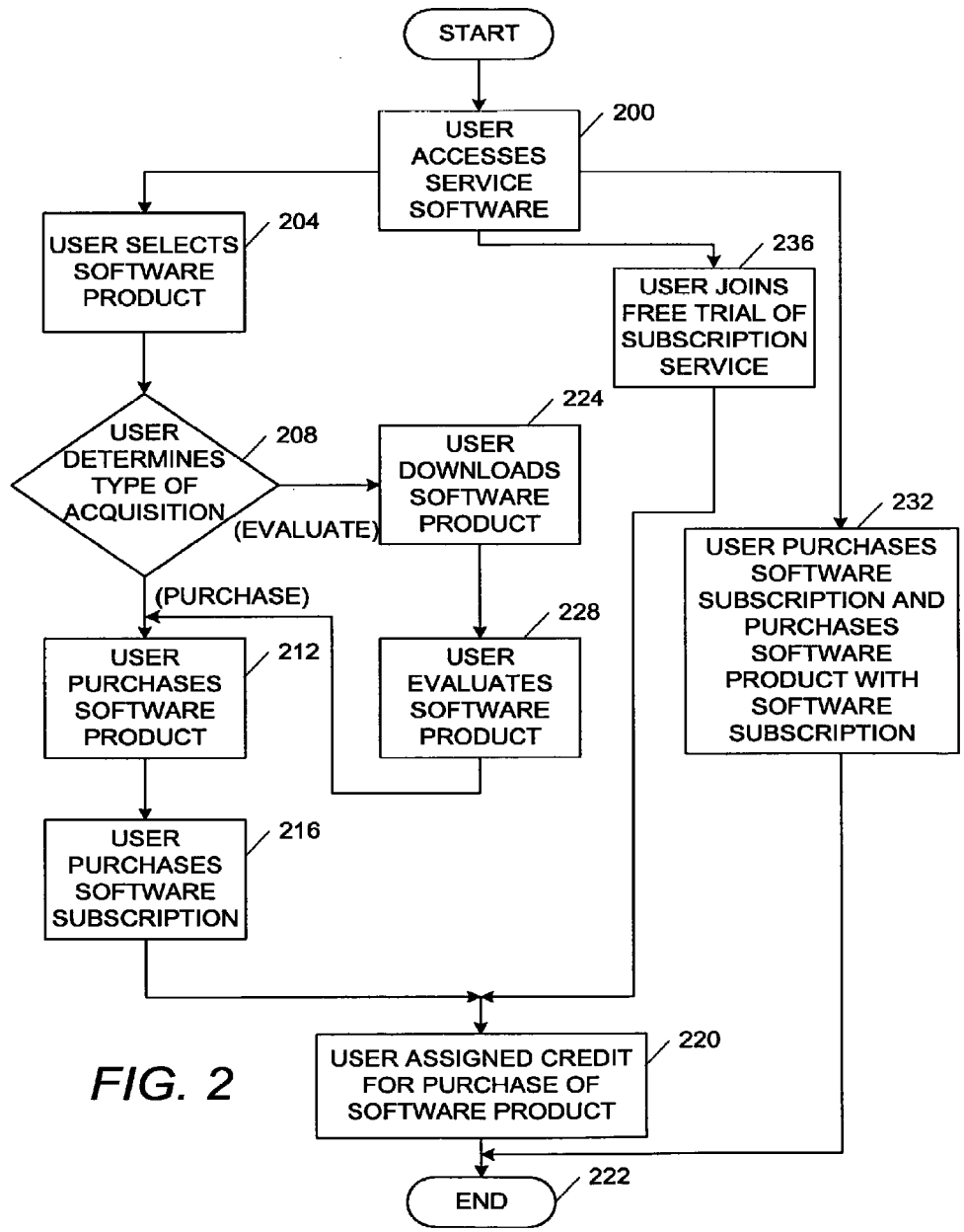
FIG. 2 is a flowchart illustrating, in one embodiment of the invention, a process for a non-subscriber for purchasing products from the system of FIG. 1.

FIG. 2 is a flowchart illustrating a process for a non-subscribed user for purchasing products from the system of FIG. 1. For convenience of description, FIG. 2 is described with respect to a user of client computer 104A. However, it is to be appreciated that the same processes occur on client computer 104B-104N. Depending on the embodiment, additional steps may be added, others removed, selected steps may be merged together, and the ordering of the steps rearranged.

Starting at a step 200, a user accesses the service software 120. The service software 120 (FIG. 1) allows a user to evaluate and purchase software products 104A-104N and/or software subscriptions for the purchase of the software products 112A-1112L. (FIG. 4 shows an exemplary user interface that may be employed to provide access to the functionality of the service software 120). In one embodiment, the service software 120 has access to a searchable database (not shown) to allow the user search for particular products names or those products falling within a selected category or sub-categories, e.g., games—action, cards, strategy and business—accounting, payroll, human resources.

Proceeding to a step 204, the user selects at least one of the software products 112A-112L. Next, at a decision step 208, the service software 120 determines the type of acquisition the user has requested for the selected software product, i.e., evaluation or purchase. If the user has requested to purchase the software product, the process proceeds to a step 212. In one embodiment of the invention, the service software 120 downloads an unrestricted-access version of the software product to the client computer 104A. Of course, in some embodiments, once the user downloads the software product, the user may enjoy all ownership rights over the software product, limited only by copyright and/or implicit or explicit licensing terms.

Figure 3:
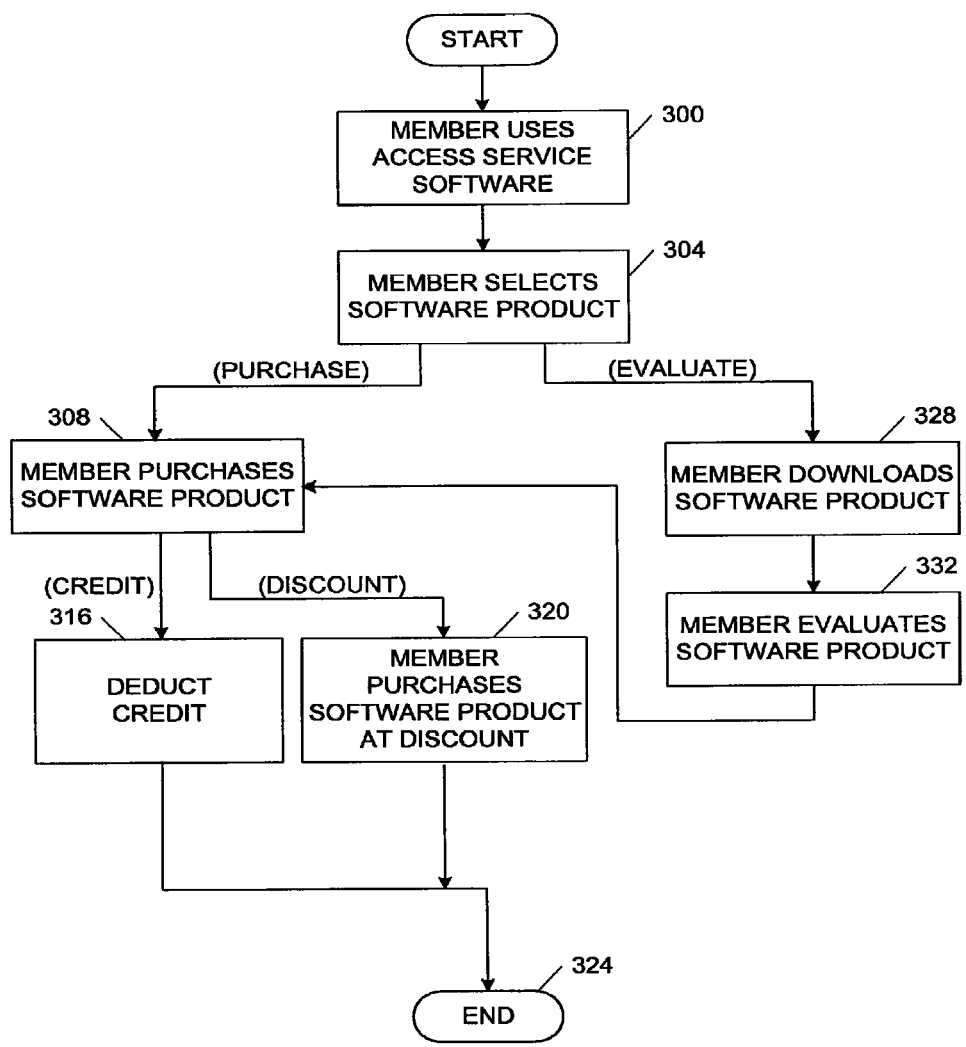
FIG. 3 is a flowchart illustrating, in one embodiment of the invention, a process for a subscriber for purchasing software products from the system of FIG. 1.

Continuing to a step 216, as part of the purchase process of the software product, the user is presented an opportunity to purchase a software subscription. In one embodiment, for the software subscription the user pays predetermined amounts during selected billing periods in a subscription period. In return, the user downloads at no additional charge one of the software products 112A-112L during each of selected credit periods. After download, the user has unrestricted access to the software downloaded products. If the user does not use a credit before the expiration of a selected credit period, the credit expires. Alternatively, the user may be offered a free trial subscription upon purchase of a software product. For example, the user may receive free of charge a membership consisting of one or more billing cycles. FIG. 3 below explains the process for purchasing software over the network 108 when the user has a membership subscription.

As part of the purchase of a software product 112A-112L and the software subscription, the user provides billing information to the service software 120. The service software 120 transmits the billing information to the server computer 100 and it is stored in the subscription database 116. Furthermore, as part of the purchase, the server computer 100 updates the subscription database 116 to reflect that the user has purchased the selected product. In one embodiment, the server computer 100 automatically sends upgrades to the purchased software as they become available. Furthermore, if the user upgrades to a new computer, the server computer 100 allows a user to re-download via the network 100 any previously purchased software products.

Next, at a step 220, the user is assigned a credit for the purchase of one of the software products. Furthermore, an expiration period is assigned to the credit. Prior to the end of the expiration period, the user may purchase one of the software products 112A-112L using the assigned credit. If the user does not purchase one of the software products 112A-112L within the expiration period, the credit expires.

Referring again to the decision step 208, if the user decides to evaluate one of the software products 112A-112L, the process proceeds to a step 224. In one embodiment, the service software 120 downloads a trial version of the software product to the client computer 104A. The trial version of the software product can be configured so that it can only run for an evaluation period, e.g., a limited number of times or for a limited duration. Next, at a step 228, the user evaluates the software product during the evaluation period. Continuing to the step 212 (discussed above), it is assumed that the user is interested in the software product 112A-112L, and purchases it.

Referring again now to the step 200, if the user purchases a software subscription, the process proceeds to a step 232. At the step 232, the user provides billing information to the service software 120. The service software 120 transmits the billing information to the server computer 100 via the network 108. The server computer 100 updates the subscription database 116 to indicate the purchase of the software product. At this step, the user is assigned a credit for the purchase of one of the software products. Furthermore, at this step, the user may purchase one of the products with the assigned credit. The process then ends at the step 222.

Referring again now to the step 200, if the user selects a free trial of the subscription service, the process proceeds to a step 236. As part of the free trial, the user is granted for a limited number of subscription periods, the ability to download one of the software products 112A-112L during each of the subscription periods. In one embodiment, after the expiration of the limited number of subscription periods, the user is automatically billed for the subscription on a periodic basis. In another embodiment of the invention, after the expiration of the limited number of subscription periods, the user is asked by the service software 120 whether he is interested in maintaining the subscription on a fee basis.

FIG. 3 is a flowchart illustrating a process for a subscribed user (a "member") for purchasing products from the system 95 of FIG. 1. For convenience of description, FIG. 3 is described with respect to a user of client computer 104A. However, it is to be appreciated that the same processes occur on client computer 104B-104N. Depending on the embodiment, additional steps may be added, others removed, selected steps may be merged together, and the ordering of the steps rearranged.

Starting at a step 300, a member accesses the service software 120. Next, at a step 304, the member selects one of the software products 112A-112L. In one embodiment, the service software 120 has access to a searchable database that allows the member to search for particular products names or those products falling within a selected category or sub-categories, e.g., games—action, cards, strategy and business—accounting, payroll, human resources.

Furthermore, at this step, the member is allowed to either (i) purchase the selected software product or (ii) evaluate the selected software product. If the member selects to purchase the selected software product, the process proceeds to a step 308, wherein, in one embodiment of the invention, the service software 120 downloads an unrestricted-access version of the software product to the client computer 104A.

Still referring to the step 308, the system 95 determines whether the member purchased the selected software product with an unexpired credit, or alternatively, using a subscription discount. In one embodiment of the invention, the member can purchase any number of software products at a predetermined subscription discount. In one embodiment of the invention, the use of the subscription discount does not affect the number of credits that have been assigned to the member. If the member purchases the software product with an unexpired credit, the process proceeds to a step 316, wherein the unexpired credit is deducted. At the beginning of the next credit period, the user is provided another credit for the purchase of one the software products 112A-112L. The number of credits per credit interval that are assigned to the member is configurable by an administrator of the server computer 100. The process proceeds to an end step 324.

Referring again to the step 308, if the member purchases the selected software product using the subscription discount, the process proceeds to a step 320. At this step, the server computer 100 charges the account of member for the purchase of the software products and credits the member's account the subscription discount. The amount of the discount may be based at least in part upon the number of software products that are purchased. In another embodiment of the invention, the amount of the discount is fixed. The process then proceeds to an end step 324.

Referring again to the step 304, if the member requests to evaluate one of the software products 112A-112L, the process proceeds to a step 328, wherein the service software 120 downloads a trial version of the software product to the client computer 104A. The trial version of the software product can be configured so that it can only run for an evaluation period, e.g., a limited number of times or for a limited duration. Next, at a step 332, the member evaluates the software product during the evaluation period. Continuing to the step 308 (discussed above), it is assumed that the member is interested in the software product 112A-112L and purchases it.

FIG. 4 shows an exemplary user interface 404 that may be used in conjunction with the systems and methods described above. The user interface 404 may be provided with, for example, the service software 120. The user interface 404 may have a "game guide" 408 that presents to the user icons 412 so that the user can indicate selection of one or more software products which the user is interested in evaluating or purchasing. The user interface 404 may be employed at step 300 of the process described with reference to FIG. 3. The user interface 404 may also include an area 416 to allow the user to indicate his desire to download a software product. Of course, user interface 404 is merely exemplary, and a person of ordinary skill in the art will readily recognize that there are multiple, equivalent ways to make accessible the functionality of the system 95 to the user.

Figure 5:
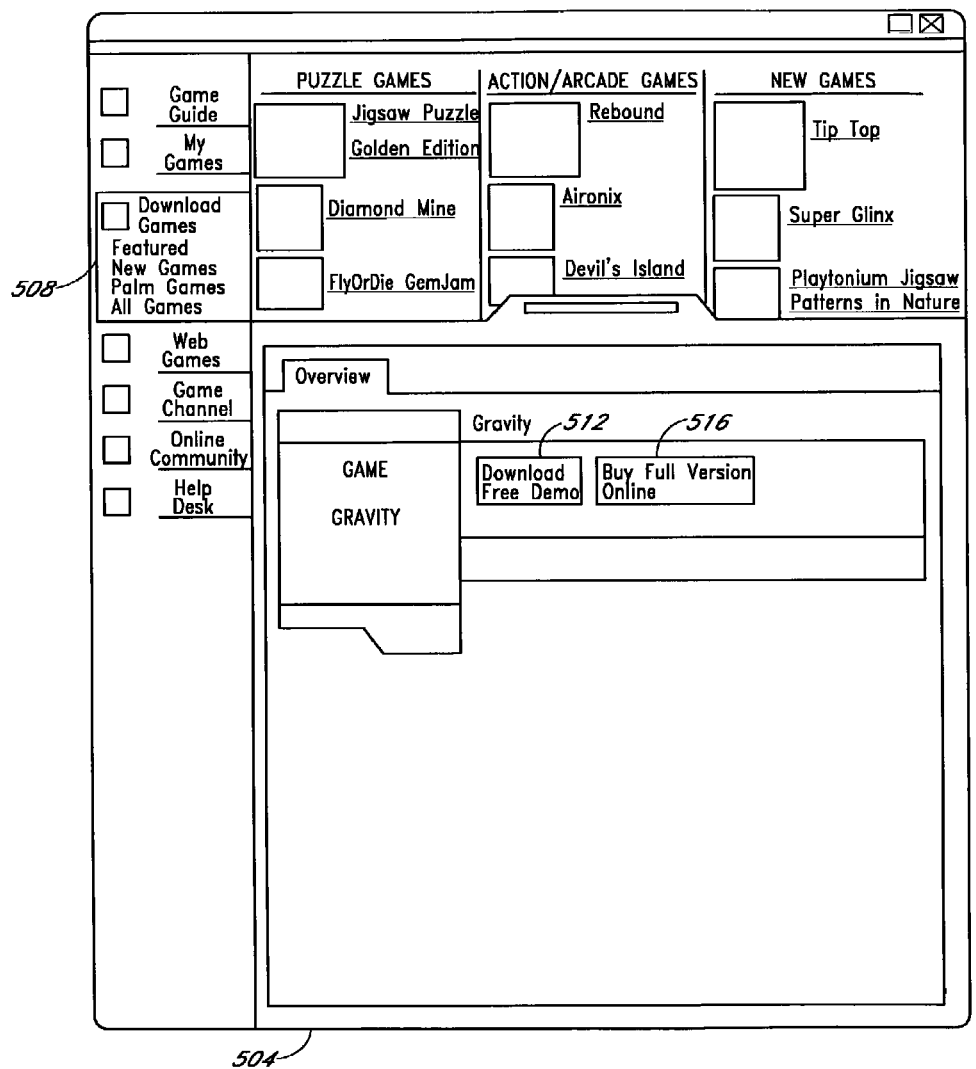
FIG. 5 is an exemplary user interface that may be used in conjunction with the process of FIG. 3.

FIG. 5 depicts an exemplary user interface 504 that may be used in conjunction with the process of FIG. 3. More specifically, with reference to step 304 of the process shown in FIG. 3, a user accesses user interface 504 to download software products which the user may desire to evaluate or purchase. An area 508 of the user interface 504 may provide a menu indicating different categories of games that the user may browse. Additionally, the user interface 504 may have an icon 512 so that the user can indicate his wish to download a demonstration version of the game. Of course, the system 95 is preferably configured to provide the functionality to transmit the selected software product from the server 100, via the network 108, to the client computer 104A-104N. The user interface 504 may also have an icon 516 for the user to instruct the system 95 that he wants to purchase the selected software product.

Figure 6:
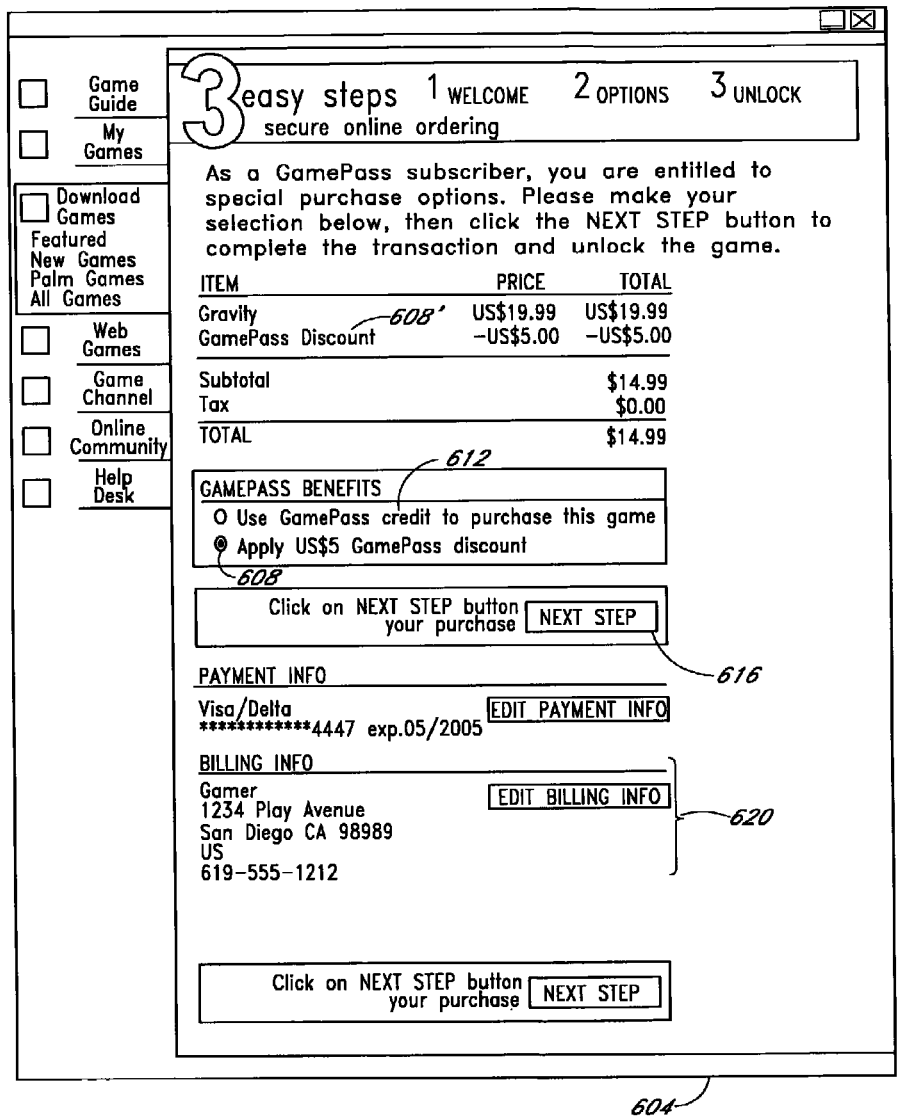
FIG. 6 is yet another exemplary user interface that may be used in conjunction with the process of FIG. 3.

FIG. 6 shows an example of a user interface 604 that may also be used in conjunction with the process of FIG. 3. The user interface 604 may be used, for example, in connection with steps 304, 316, and 320 of the process described with reference to FIG. 3. The user interface 604 may have an input button 608 so that the user can indicate that he wishes to apply a discount (see step 320) to his purchase of the software product. The user interface 604 may also provide an input button 612 for the user to indicate that he would like to apply a credit to the purchase. In this embodiment, the user interface 604 presents to the user information regarding the transaction. For example, at area 608' the users selection of applying a discount to the product purchase is shown. In some embodiments, such as shown in FIG. 6, the user interface 604 provides an input button 616 so that the user is able to indicate that he is ready to complete the purchasing transaction and download the software product. Furthermore, in embodiments, where the user is a member to the subscription program, the user's billing information may be displayed in an area 620 as shown. As discussed above, the billing information may be obtained at some point during the processes of shown in FIG. 2 or 3.

It should be understood that user interfaces 404, 504, and 604 are merely exemplary and in no way limit the inventive systems and methods described above and recited in the claims below. The user interfaces 404, 504, and 604 exemplify some of the ways in which the system 95 presents its functionality to a user.

Figure 7:
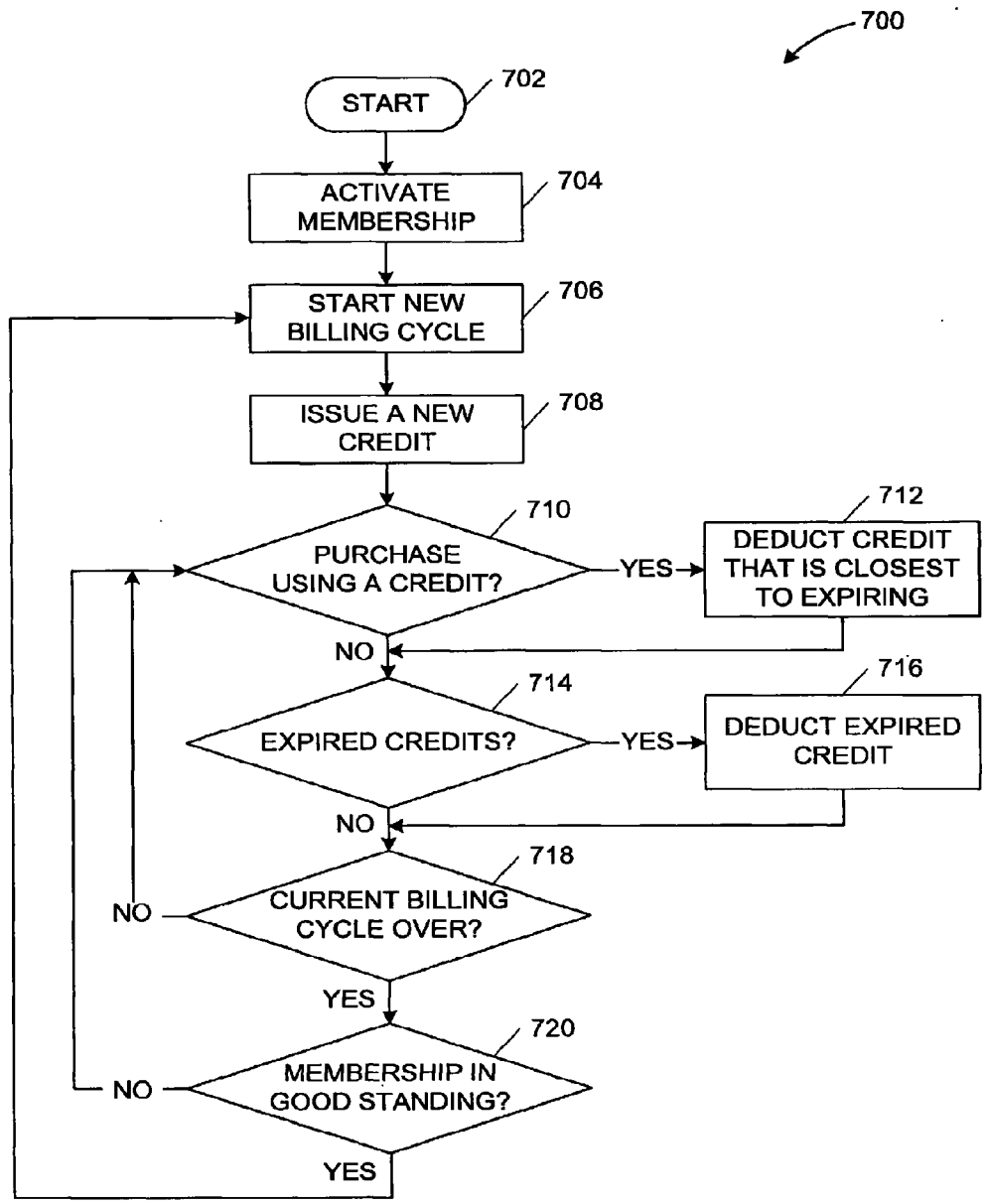
FIG. 7 is a flowchart illustrating a process for managing a software purchasing subscription.

FIG. 7 is a flowchart illustrating a process 700 for managing a software purchasing subscription in accordance with one embodiment of the invention. The process 700 starts at a step 702 after configuration of the system 95 (see FIG. 1). The process 700 proceeds to a step 704 where the system 95 activates a user's membership account ("account") for the software purchase subscription. In one embodiment, activation of the account involves the server computer 100 acquiring a user's billing information (e.g., credit card information), client computer 104A configuration (e.g., type of communications port), etc. The process 700 next proceeds to a step 706 where the server computer 100 starts a new billing cycle for the account. The server computer 100 may indicate the start of a new billing cycle by updating a field of the subscription database 116, or by updating a remote database (not shown) that is in communication with the server computer 100, for example.

Next, at a step 708 of the process 700, the server computer 100 issues a new purchase credit to the account. This task involves the server computer 100 updating a field in the subscription database 116, for example. The purchase credit allows the user to acquire a software product 112A-112L at no additional charge, or at a discounted price, etc. Of course, depending on the embodiment, the server computer 100 may issue multiple purchase credits after the start of a new billing cycle. For example, if a user pays $20 per billing period of the subscription, the server computer 100 may issue one purchase credit. However, if a user pays $30 per billing period, the server computer 100 may issue three purchase credits per billing period.

The process 700 next proceeds to a decision step 710 where the server computer 100 receives input from the account's user, i.e., the "member", regarding the method of purchasing a software product 112A-112L. The server computer 100 determines whether or not the member indicates purchase of a software product 112A-112L with a purchase credit. If the server computer 100 determines that the member indicates a purchase of a software product 112A-112L using a purchase credit, the process 700 proceeds to a step 712 where the server computer 100 deducts from the account the purchase credit having a time stamp indicating that the purchase credit is the closest to expiration. If however, at the decision step 710 the server computer 100 determines that the member indicates that the purchase of a software product 112A-112L does not use a purchase credit, the process 700 moves to a decision step 714.

At the decision step 714, the server computer 100 queries whether any of the of credits in the account have expired. As previously explained with reference to the process shown in FIG. 3, in one embodiment a credit expires if it is not used within a predetermined period of time, for example. Of course, expiration of credits may be based on other criteria, e.g., a credit may expire if the number of credits in the account exceeds a predetermined number. If the server computer 100 determines that there is an expired credit in the account, the process 700 proceeds to a step 716 where the server computer 100 deducts the expired credit from the account. The server computer 100 may deduct the expired credit by, for example, modifying a data record in the subscription database 116. If, on the other hand, the server computer 100 determines at the decision step 714 that there is no expired purchase credit in the account, the process 700 continues to a decision step 718.

The server computer 100 determines at the decision step 718 whether the current billing cycle is over. As discussed above with reference to the process illustrated in FIG. 3, in one embodiment of the invention a member pays a predetermined amount during selected billing periods, which billing periods may or may not coincide with credit periods in which the account is provided with additional purchase credits or debited because of expired purchase credits. In the embodiment of FIG. 7, the billing cycle coincides with the credit period. That is, for each billing period there is one credit period. If the server computer 100 determines that the current cycle is not over, the process 700 returns to the decision step 710 and continues as discussed above.

If the server computer 100 determines at the decision step 718 that the current cycle is over, the process 700 moves to a step 720 where the server computer 100 queries whether the membership is in good standing. Of course, there are many criteria that may be employed to characterize a membership as being in good standing or not. For example, if a member has not made the required periodic payment for the subscription, the membership may be deemed to not be in good standing. By way of another example, if a user cancels the membership the account may remain valid for one or more credit periods; however, at the end of the remaining credit periods the membership would be deemed to not be in good standing. If the server computer 100 determines that the membership is not in good standing, the process 700 returns to the step 710 and continues as previously described. In one embodiment the process 700 continues to loop between steps 710 and 718 as long as the membership is not in good standing. However, in other embodiments, the process 700 may terminate upon a determination that the membership is not in good standing.

If the computer server 100 determines at decision step 720 that the membership is in good standing, the process 700 returns to the step 706 and starts a new billing cycle. In one embodiment, as long as the membership remains in good standing, the process 700 loops from step 706 to step 720 indefinitely. Hence, a member's subscription period may include multiple billing cycles in which purchase credits are issued, used to purchase software products, and/or deducted from the account as expired because not used within a credit period. Of course, depending on the specific embodiment, the process 700 may include additional or fewer steps, selected steps may be merged together, and the ordering of the steps rearranged.

It should be apparent to a person of ordinary skill in the relevant technology that the system 95 of FIG. 1, in cooperation with any of the processes discussed above, provides a way for distributors of software products to reduce distribution costs and to create recurring revenue streams. Furthermore, in some embodiments the system 95 is beneficial to users since they acquire personal ownership of the software products, providing the users with unrestricted access to the purchased products.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. Non-transitory program storage storing application program instructions for use by a handheld client that in operation is capable of communicating with a server via at least one network that includes an Internet network, the instructions when executed by the client resulting in performance of operations comprising:

presenting a user interface that is capable, at least in part, of receiving a request for at least one service that is capable of being associated, at least in part, with a subscription, the at least one service being capable of being provided, at least in part, by the server to the client via the at least one network, the subscription being capable of being associated with:

a subscriber-selectable subscription plan associated with a recurring subscription payment and a number of credits permitting an associated number of audio books to be purchased, the number of credits to be credited at a certain time interval, the subscriber-selectable subscription plan being one of a plurality of available subscription plans, the available subscription plans being associated with respective numbers of credits and respective subscription plan payments;

relatively reduced price audio book purchase, the relatively reduced price audio book purchase being relative to relatively higher price audio book purchase that is available for a non-subscriber;

the at least one service being capable of including:

name-based audio book searching for at least one certain audio book that satisfies at least one user selectable name and is capable of being purchased via the server; and/or downloading, at least in part, to the client, of audio book data associated with a purchased audio book;

wherein:

the client comprises client software to be executed by the client, the client software, when executed by the client, resulting in the client being capable of downloading subscription-related client application-related instructions via the at least one network;

after an upgraded version of the client application-related instructions becomes available, the client is capable, when the client is in the operation, of receiving an automatic download of the upgraded version of the client application-related instructions from the server;

the user interface is capable of presenting, when the client is in the operation, at least one user selectable area and at least one other user selectable area, the at least one user selectable area being to request application of at least one credit for use in at least one audio book purchase, the at least one other user selectable area being to request the relatively reduced price audio book purchase;

after a user associated with the client becomes associated with another client, the client application-related instructions are to be permitted by the server to be downloaded again to the another client via the at least one network;

the user interface is also capable of presenting, when the client is in the operation, user selectable icons and user selectable items associated, at least in part, with downloadable audio book products;

the user selectable icons include top audio book icons, new audio book icons, featured audio book icons, online purchase-related icons, and audio book evaluation version-related cons;

the user selectable items include at least one free product item, at least one audio book-related channel item, and at least one audio book-related online community-related item;

the server is to maintain a subscription database that includes billing information provided to the server from the client, and the server is to update the subscription database to reflect purchase of the at least one audiobook purchase.

2. The program storage of claim 1, wherein:

the subscription is associated, at least in part, with at least one user account whose creation is capable of being requested, at least in part, remotely from the server, via an Internet browser.

3. The program storage of claim 1, wherein:

the at least one service also is capable of including category and subcategory-based audio book searching.

4. The program storage of claim 1, wherein:

the subscription comprises a trial subscription.

5. The program storage of claim 1, wherein:
the at least one service also is also capable of including provision of other audio data to permit user evaluation of whether to purchase another audio book associated with the other audio data.

6. The program storage of claim 1, wherein:
the client comprises a touch screen to receive user input in response to user prompts.

7. The program storage of claim 1, wherein:
the at least one network comprises local area network.

8. A handheld client that is capable of communicating with a server via at least one network that includes an Internet network, the handheld client comprising:
program storage to store program instructions;
a processor to execute the program instructions, the program instructions when executed by the processor resulting in the handheld client being capable of presenting a user interface that is capable, at least in part, of receiving a request for at least one service that is capable of being associated, at least in part, with a subscription, the at least one service being capable of being provided, at least in part, by the server to the client via the at least one network, the subscription being capable of being associated with:
a subscriber-selectable subscription plan associated with a recurring subscription payment and a number of credits permitting an associated number of audio books to be purchased, the number of credits to be credited at a certain time interval, the subscriber-selectable subscription plan being one of a plurality of available subscription plans, the available subscription plans being associated with respective numbers of credits and respective subscription plan payments;
relatively reduced price audio book purchase, the relatively reduced price audio book purchase being relative to relatively higher price audio book purchase that is available for a non-subscriber;
the at least one service being capable of including:
name-based audio book searching for at least one certain audio book that satisfies at least one user selectable name and is capable of being purchased via the server; and/or
downloading, at least in part, to the client, of audio book data associated with a purchased audio book;
wherein:
the client comprises client software to be executed by the client, the client software, when executed by the client, resulting in the client being capable of downloading subscription-related client application-related instructions via the at least one network;
after an upgraded version of the client application-related instructions becomes available, the client is capable, when the client is in the operation, of receiving an automatic download of the upgraded version of the client application-related instructions from the server;
the user interface is capable of presenting, when the client is in the operation, at least one user selectable area and at least one other user selectable area, the at least one user selectable area being to request application of at least one credit for use in at least one audio book purchase, the at least one other user selectable area being to request the relatively reduced price audio book purchase;
after a user associated with the client becomes associated with another client, the client application-related instructions are to be permitted by the server to be downloaded again to the another client via the at least one network;
the user interface is also capable of presenting, when the client is in the operation, user selectable icons and user selectable items associated, at least in part, with downloadable audio book products;
the user selectable icons include top audio book icons, new audio book icons, featured audio book icons, online purchase-related icons, and audio book evaluation version-related icons;
the user selectable items include at least one free product item, at least one audio book-related channel item, and at least one audio book-related online community-related item;
the server is to maintain a subscription database that includes billing information provided to the server from the client, and the server is to update the subscription database to reflect purchase of the at least one audiobook purchase.

9. The handheld client of claim 8, wherein:
the subscription is associated, at least in part, with at least one user account whose creation is capable of being requested, at least in part, remotely from the server, via an Internet browser.

10. The handheld client of claim 8, wherein:
the at least one service also is capable of including category and subcategory-based audio book searching.

11. The handheld client of claim 8, wherein:
the subscription comprises a trial subscription.

12. The handheld client of claim 8, wherein:
the at least one service also is also capable of including provision of other audio data to permit user evaluation of whether to purchase another audio book associated with the other audio data.

13. The handheld client of claim 8, wherein:
the client comprises a touch screen to receive user input in response to user prompts.

14. The handheld client of claim 8, wherein:
the at least one network comprises local area network.

15. The program storage of claim 1, wherein:
the searching is also based, at least in part, upon category and/or subcategory.

16. The handheld client of claim 8, wherein:
the searching is also based, at least in part, upon category and/or subcategory.

* * * * *